United States Patent
Mantovani

(10) Patent No.: US 9,077,236 B2
(45) Date of Patent: Jul. 7, 2015

(54) PERMANENT MAGNET ROTOR FOR A ROTARY ELECTRIC MACHINE

(75) Inventor: Alberto Mantovani, Massa Finalese (IT)

(73) Assignee: MONTANARI GIULIO & C. S.R.L., Modena (IT)

( * ) Notice: Subject to any disclaimer, the term of this patent is extended or adjusted under 35 U.S.C. 154(b) by 293 days.

(21) Appl. No.: 13/610,409

(22) Filed: Sep. 11, 2012

(65) Prior Publication Data
US 2013/0082561 A1    Apr. 4, 2013

(30) Foreign Application Priority Data

Sep. 30, 2011    (IT) .............................. MO2011A0252

(51) Int. Cl.
| | | |
|---|---|---|
| *H02K 21/12* | (2006.01) | |
| *H02K 29/03* | (2006.01) | |
| *H02K 15/03* | (2006.01) | |
| *H02K 1/27* | (2006.01) | |

(52) U.S. Cl.
CPC ............... *H02K 21/12* (2013.01); *H02K 1/278* (2013.01); *H02K 29/03* (2013.01); *H02K 1/2773* (2013.01); *H02K 15/03* (2013.01); *H02K 2213/03* (2013.01)

(58) Field of Classification Search
CPC ............................... H02K 1/278; H02K 21/12
USPC ........................... 310/156.01–156.84; 29/596
See application file for complete search history.

(56) References Cited

U.S. PATENT DOCUMENTS

| | | | | |
|---|---|---|---|---|
| 6,703,741 | B1 * | 3/2004 | Ifrim ........................ | 310/156.19 |
| 7,982,352 | B2 * | 7/2011 | Nymann et al. ......... | 310/156.32 |
| 8,624,456 | B2 * | 1/2014 | Lamperth et al. ........ | 310/156.31 |
| 2006/0238064 | A1 | 10/2006 | Lopatinsky et al. | |
| 2008/0246362 | A1 | 10/2008 | Hirzel | |
| 2009/0322177 | A1 * | 12/2009 | Perera .......................... | 310/195 |
| 2010/0156227 | A1 * | 6/2010 | Hung ....................... | 310/156.38 |
| 2013/0009506 | A1 * | 1/2013 | Iwakiri et al. ............ | 310/156.12 |

FOREIGN PATENT DOCUMENTS

| | | |
|---|---|---|
| DE | 10009462 A1 | 8/2001 |
| WO | 2007072010 A1 | 6/2007 |

* cited by examiner

*Primary Examiner* — Hanh Nguyen
(74) *Attorney, Agent, or Firm* — Pearne & Gordon LLP

(57) ABSTRACT

A permanent magnet rotor (3) for a rotary electric machine (1) comprises a rotor body (10) having a rotation axis (A) and a plurality of radial magnets (4), wherein the magnets (4) exhibit a head portion (5) located in proximity to an external surface (30) of the rotor body (10) and a base portion (6) facing towards the rotation axis (A). The base portion (6) of each magnet (4) has a width smaller than a width of the head portion (5).

9 Claims, 5 Drawing Sheets

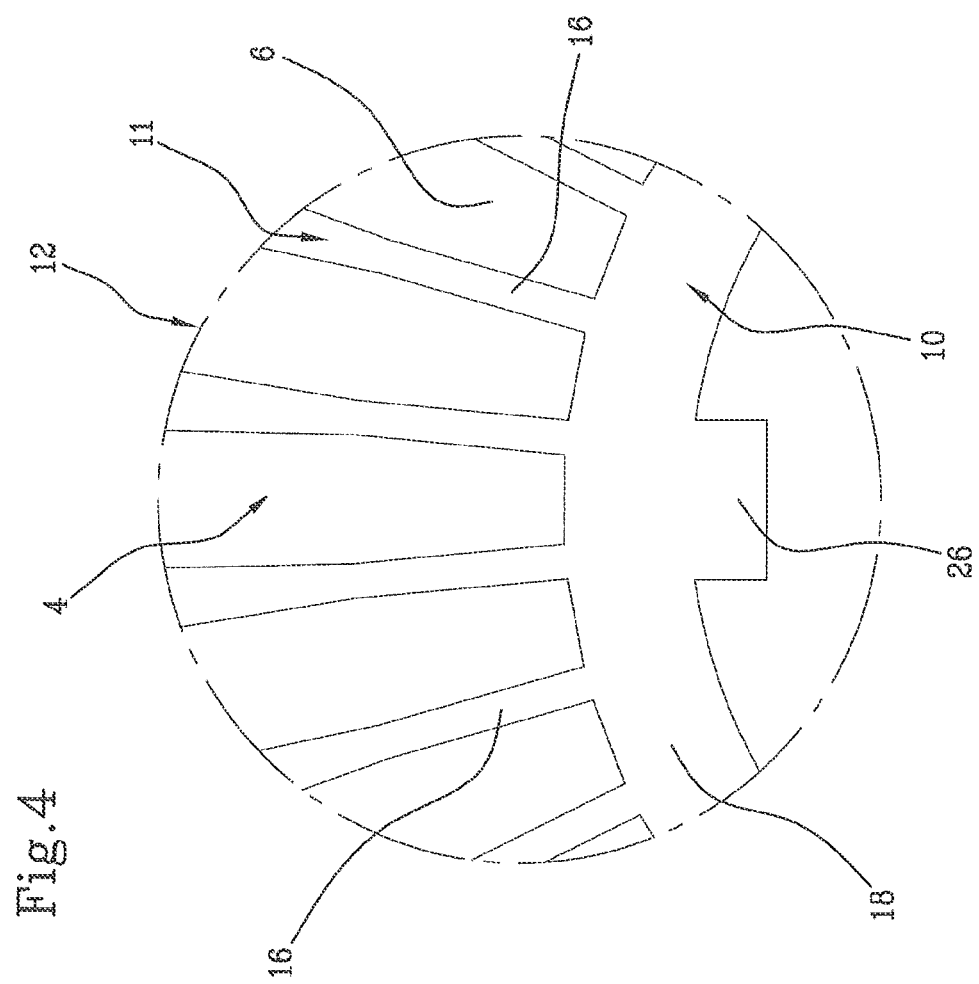

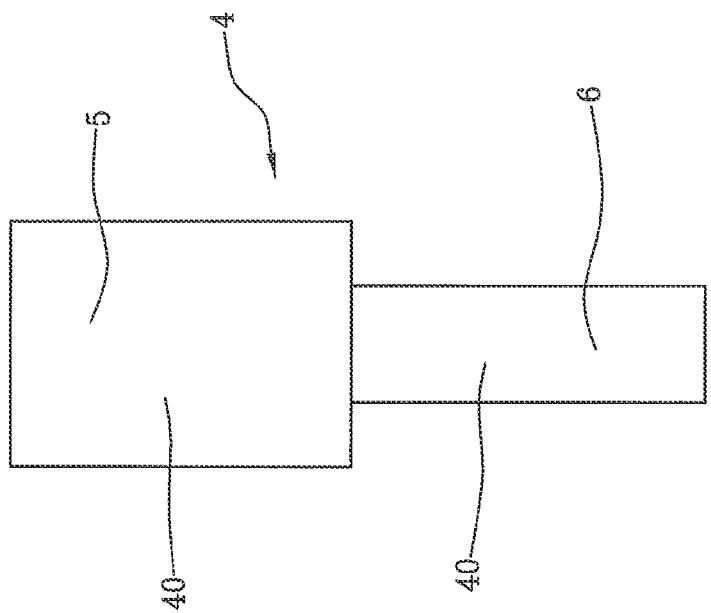
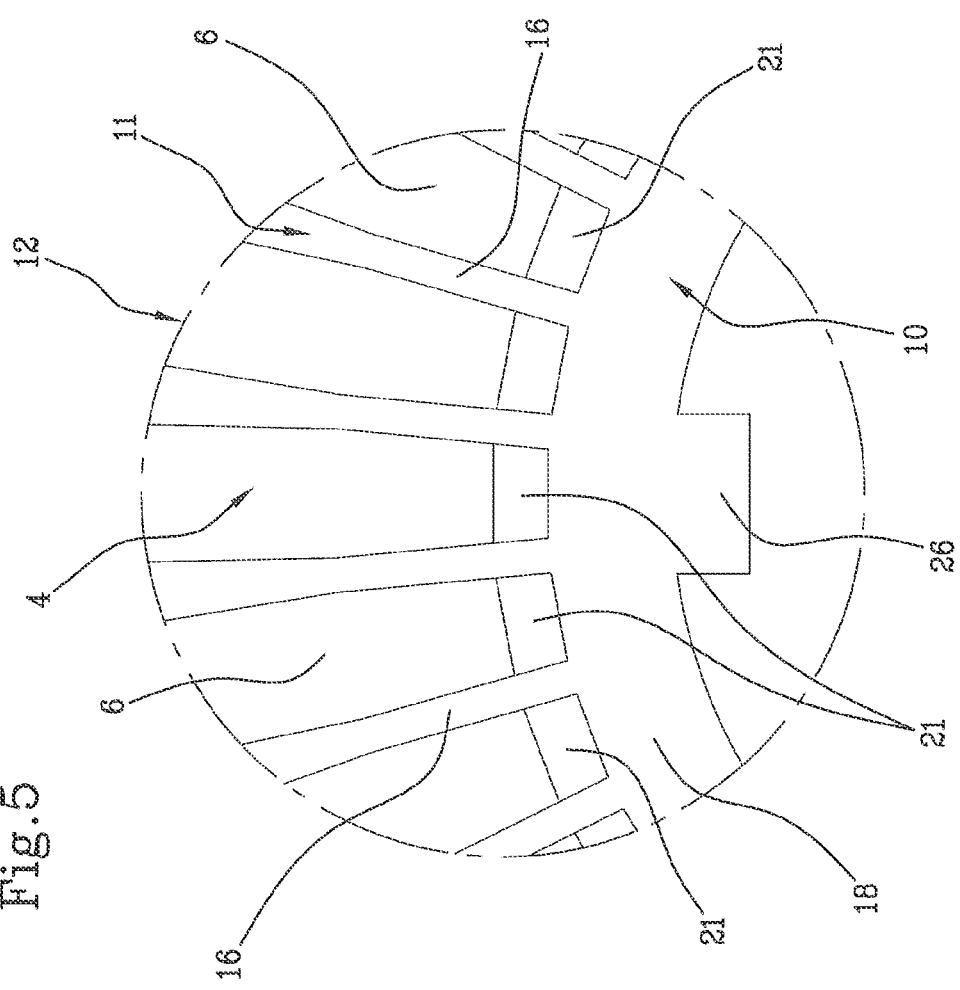

PERMANENT MAGNET ROTOR FOR A ROTARY ELECTRIC MACHINE

The present invention relates to a permanent magnet rotor for a rotary electric machine. In particular, the rotor has a high flux density and permanent magnets arranged radially. The present invention has application, in particular, in the construction of synchronous electric machines.

In synchronous machines, the rotor exhibits a plurality of permanent magnets whose magnetic field interacts with the windings of the stator power circuit. The magnetic interaction between stator and rotor produces the mechanical power.

The number of permanent magnets mounted on the rotor determines the number of magnetic poles of the rotor itself.

Various embodiments of rotors for synchronous motors are known. Among them, two particular types of rotors for synchronous motors are considered. The first type is called "surface magnet" whereas the second is called "radial magnet".

The main difference between the two types consists in the arrangement of the magnets inside the rotor.

Considering a rotor having a substantially cylindrical form, in "surface magnet" rotors the magnets are arranged along the cylindrical surface of the rotor itself. It follows that the polar expansions of said type are arranged, precisely, along the lateral surface of the rotor.

Rotors of the "radial magnet" type, on the contrary, have the magnets arranged along radial directions. In other words, the prevalent direction of extension of the individual magnet is directed radially from the rotation axis of the rotor.

The first constructive solution ("surface magnet") is typically realised using permanent magnets made with alloys comprising rare earth elements e.g. NdFeB), which exhibit a high magnetic induction (e.g. 1.2 T).

In fact, while obtaining high torque densities, the "surface magnet" type enables greater motor compactness to be obtained provided that high-performance magnets, such as, precisely, those with rare earth elements, are used. A rotor made with rare earth magnets arranged on the surface is the type preferred to obtain a motor with a high torque density and exhibiting high dimensional compactness.

However, the cost of rare earth elements has increased considerably recently. This means a substantial increase in the production cost (as much as ¼), the synchronous motor realised being equal.

Therefore, with a view to realising a synchronous motor that is compact, high performance (i.e. with a high torque density) and economically and productively sustainable at the same time, realising a synchronous motor having a "radial magnet" rotor with magnets made with materials whose performance is lower than that of rare earth elements (e.g. ferrite magnets) was considered.

Comparing the two types of magnets, one may highlight the fact that, as noted, rare earth magnets exhibit a magnetic induction of about 1.2 T, whereas ferrite magnets exhibit a magnetic induction of about 0.4 T.

The challenge met by the present invention consists in the realisation of a synchronous "radial ferrite magnet" motor that is compact and high performance like the equivalent "surface magnet" motor, but economically advantageous to produce.

As noted, there is a factor of "three" between the values of magnetic induction of rare earth magnets and ferrite ones. If one wishes to maintain compact motor dimensions, the other parameter that can be acted on to increase the performance of the rotor is the surface usable for the development of flux lines. Therefore, the usable surface of a "radial magnet" rotor (Smr) must be at least three times the usable surface of a "surface magnet" rotor (Sms): $Smr=3 \cdot Sms$ The usable surface of a "surface magnet" rotor is: $Sms=2 \cdot \pi \cdot R \cdot L$, where R is the radius of the rotor and L the length of the cylindrical surface of the rotor.

The usable surface of a "radial magnet" rotor instead follows the formula: $Smr=Np \cdot (R-Ra) \cdot L$, with Np representing the number of polar expansions (poles), R the radius of the rotor (hence the external radius of the magnets) and Ra the internal radius of the magnets.

This difference in the formulas is based on the fact that, in "surface magnet" rotors, the surfaces usable for the delivery of usable magnetic flux are disposed along two concentric circumferences.

In "radial magnet" rotors, the surfaces usable for the delivery of usable magnetic flux are the lateral surfaces, i.e. those arranged in a substantially radial direction. It follows that in the calculation of the maximum usable surface for the "radial magnet" configuration, these lateral surfaces (i.e. the term (R−Ra)) and the number thereof (i.e. the number of poles, Np) are included.

Following the compactness constraint, the length of the rotor L is a parameter that it is desired to maintain fixed for both types of construction. Therefore, in order to make up for the magnetic induction factor of "three", one can act only on the number of poles (Np of the formula) realisable on the "radial magnet" rotor.

If the formulas mentioned are combined, assuming the extreme situation of an internal radius (Ra) equal to zero, the minimum number of poles (Np) for obtaining the same torque density in the two types is equal to 20. It being impossible to realise a rotor with Ra equal to zero, this means that Np must certainly be greater than 20.

At this point the technological limits to the realisation of a rotor that is simultaneously compact and has a high number of poles come into play. In fact, in this configuration it is not easy to reconcile the high number of poles, the structural mechanical strength of the rotor, a high magnetic permeance to the flux concatenated with the stator and a low magnetic permeance to the non-usable flux, i.e. that which loops back onto the rotor itself.

In this context, the technical task at the basis of the present invention is to propose a solution for the above-mentioned drawbacks of the prior art.

An object of the present invention is to propose a permanent magnet rotor of the "radial magnet" type with a low residual induction, which exhibits the same performance as a permanent magnet rotor of the "surface magnet type" with a high residual induction, the overall dimensions being equal.

A further object of the present invention is to propose a permanent magnet rotor of the "radial magnet" type with a high number of poles and, at the same time, a high structural mechanical strength.

A further object of the present invention is to propose a permanent magnet rotor of the "radial magnet" type which exhibits high performance, and in particular serves to maximise the magnetic permeance to the flux concatenated with the stator and minimise the magnetic permeance to the non-usable flux, i.e. that which loops back onto the rotor itself.

The stated technical task and specified objects are substantially achieved by a permanent magnet rotor comprising the technical features set forth in one or more of the appended claims.

Additional features and advantages of the present invention will be more apparent from the approximate, and hence non-restrictive description of a preferred but non-exclusive embodiment of a permanent magnet rotor, as illustrated in the appended drawings, in which:

FIG. 4 represents a second enlarged detail of the permanent magnet rotor of FIG. 2;

FIG. 5 represents a second enlarged detail of the permanent magnet rotor in a second embodiment;

FIG. 6 represents an alternative embodiment of the permanent magnets present in the rotor according to the present invention.

Figure 1:
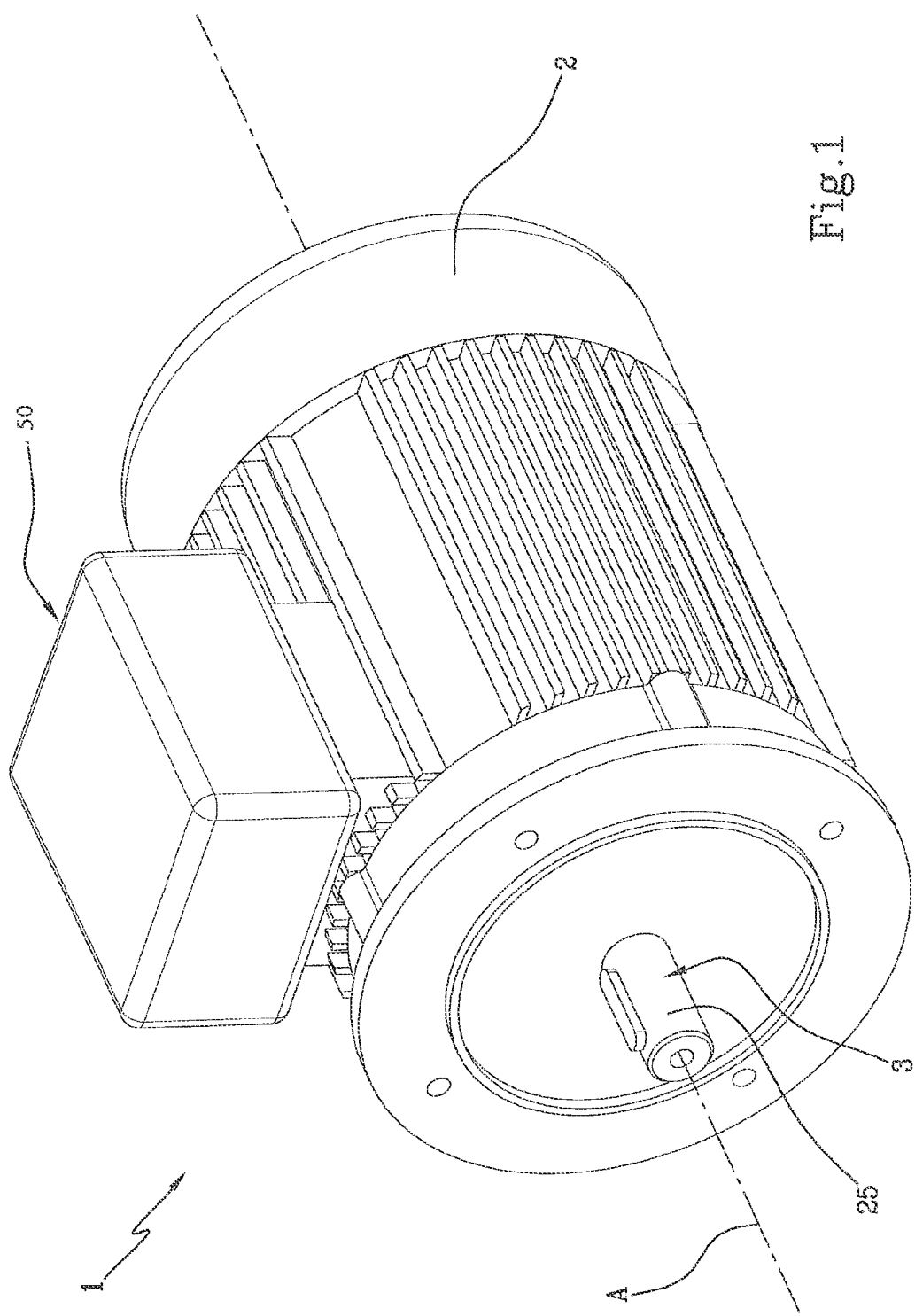
FIG. 1 represents a perspective view of a rotary electric machine comprising a permanent magnet rotor according to the present invention.

With reference to the appended figures, 1 indicates overall a rotary electric machine comprising a permanent magnet rotor 3 according to the present invention and a stator 2.

The motor 1 further comprises a terminal block 50 for connecting to the mains electricity supply, in particular for powering the stator circuits.

The rotor 3 comprises a drive shaft 25 associable with the stator by means of at least two bearings of a known type.

The rotor 3 comprises a rotor body 10 and a plurality of permanent magnets 4.

Figure 2:
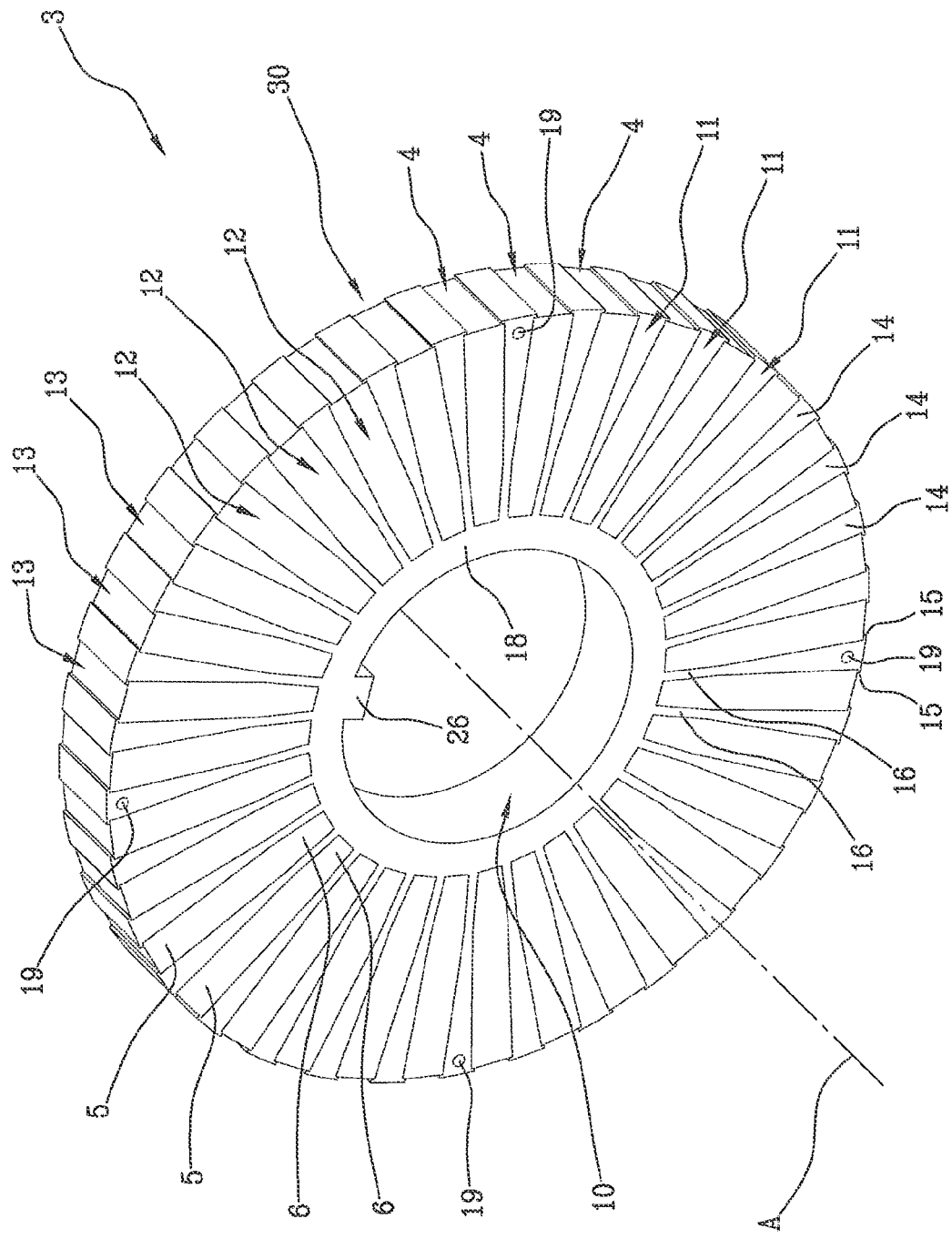
FIG. 2 represents a perspective view of the permanent magnet rotor to according to the present invention.

The rotor body 10 has a rotation axis "A" substantially coinciding with the lengthwise axis of the drive shaft 25. Said rotor body 10, illustrated in FIG. 2, has an intentionally reduced thickness (along the axis "A") for illustrative reasons. This thickness could in reality also be much greater.

The rotor body 10 is defined by a plurality of small plates 20 packed together along the rotation axis "A". These small plates 20 each have a thickness comprised between 0.3 mm and 5 mm because in such a manner they are much simpler to machine on machine tools as compared to a cast block. The small plates 20 are made of ferromagnetic material.

The rotor body 10 exhibits a plurality of radial expansions 11 and a plurality of housing seatings 12, intercalated with the radial expansions 11 in order to house the magnets 4. The radial expansions 11 and, consequently, the housing seatings 12 are equally angularly spaced around the rotation axis "A".

Said radial expansions 11 are moulded onto the aforesaid small plates 20.

The rotor body 10 further comprises a support ring 18 which, internally, can be stably connected to the drive shaft 25, for example by means of a key 26, while on the outer surface thereof it mechanically supports the radial expansions 11, thus imparting mechanical solidity to the rotor body 10.

Each pair of contiguous radial expansions 11 exhibits respective peripheral portions 14 distanced from one another in order to define respective separating openings 13 suitable for preventing the direct passage of magnetic flux between said peripheral portions 14. Preferably, the separating opening 13 extends along the whole length (in the axial direction) of the rotor body 10.

Said separating opening 13 has the particular effect of creating a "barrier" to the magnetic flux generated by the magnets 4, which, without the separating opening 13, would be looped between two successive radial expansions 11 and would not be concatenated with the magnetic flux generated by the stator 2. In fact, the separating opening 13, being a virtual air gap, blocks the lines of magnetic flux that would otherwise travel from one radial expansion 11 to the contiguous one, i.e. without being concatenated with the magnetic flux of the stator 2, consequently limiting the maximum torque generated by the machine 1.

Figure 3:
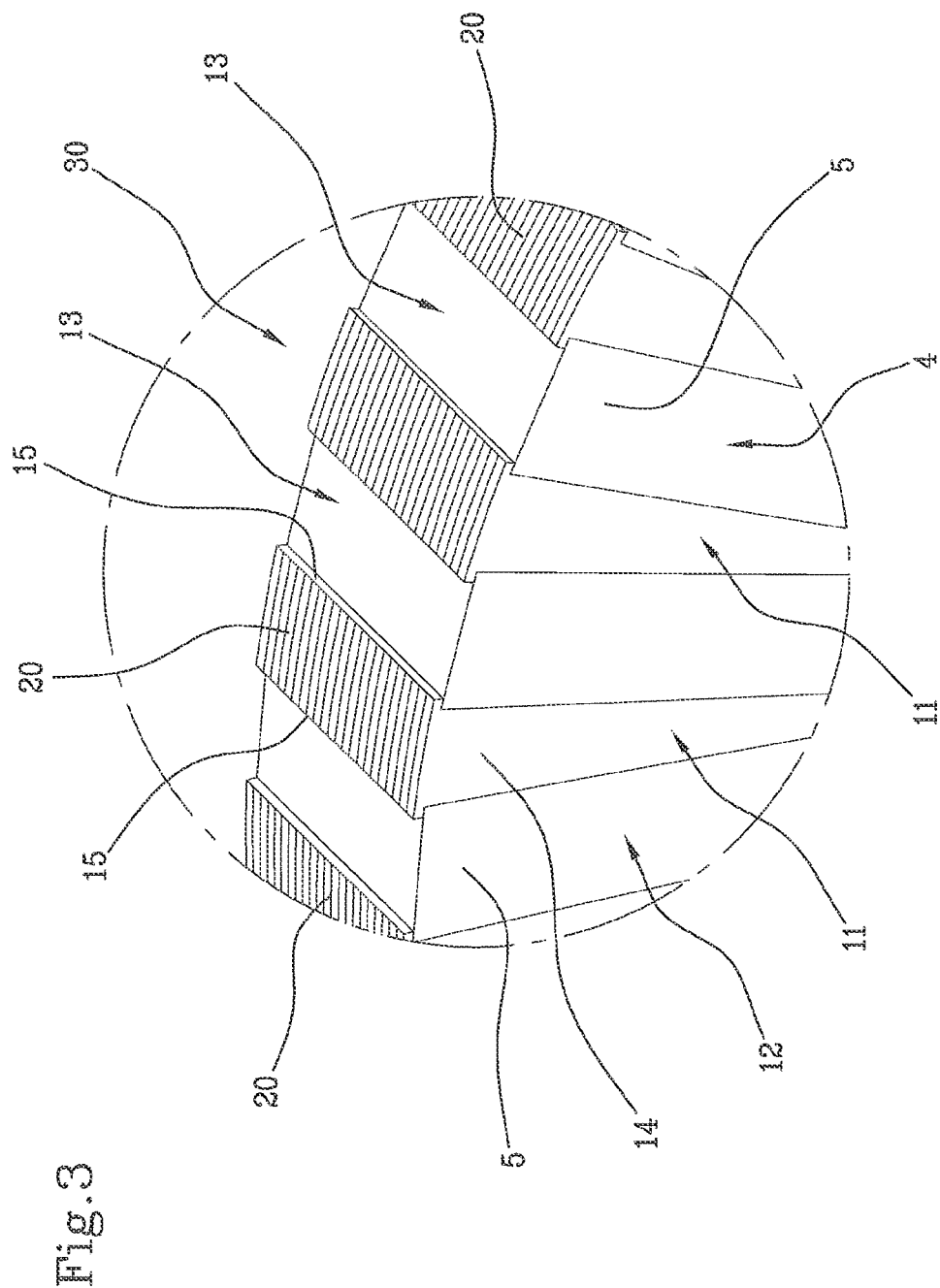
FIG. 3 represents a first enlarged detail of the permanent magnet rotor of FIG. 2.

As can be seen in FIG. 3, the peripheral portions 14 of each radial expansion 11 further exhibit lateral hooking portions 15 facing towards the contiguous radial expansions 11 (hence in a "T" configuration) in order to retain the adjacent magnets 4 internally of the respective housing seatings 12.

As can be seen in FIG. 3, the lateral hooking portions 15 extend along a direction that is substantially tangential to the external surface 30 of the rotor body 10 and engage the respective adjacent magnets 4. In particular, it is the lateral hooking portions 15 of the radial expansions 11 which delimit and define the dimensions of the separating openings 13. Said lateral hooking portions 15 have the further function of limiting the "cogging torque". "Cogging torque" is a torque generated by the interaction of the permanent magnets and the stator cogs, highly undesirable because it hinders the regular rotation of the rotor, resulting in the generation of vibrations and noise in the motor. The lateral hooking portions 15 enable the variation in the reluctance to rotation to be reduced, thus limiting the "cogging torque".

Observing the detail of FIG. 4, it may be seen that each radial expansion 11 of the rotor body 10 exhibits, at the base, a saturation portion 16. Each saturation portion 16 is structurally interposed between the support ring 18 and the peripheral portion 14 of each radial expansion 11.

The term "saturation" means the reaching of the maximum magnetic flux within the usable section of each saturation portion 16, which is thus in a condition of not being able to accept any additional magnetic flux.

In particular, reference will be made to a "usable magnetic flux" and a "parasitic magnetic flux".

"Usable magnetic flux" defines the magnetic flux generated by the permanent magnets of the rotor which passes across the air gap between the rotor and stator and is concatenated with the magnetic flux generated by the stator. The greater the "usable magnetic flux", the greater the torque that can be developed by the electric machine.

"Parasitic magnetic flux" defines the magnetic flux generated by the permanent magnets of the rotor which loops back onto the rotor itself and is not concatenated with the stator magnetic flux. As the "parasitic magnetic flux" does not interact with the stator flux, it does not generate motor power; hence it is called "parasitic".

In particular, the saturation portions 16 are substantially passed across (and saturated), given the internal position thereof in the rotor 3, by the "parasitic flux" lines which loop back onto on the support ring 18 and are thus not concatenated with the stator 2. The dimensions and geometry of the saturation portions 16 influence the behaviour of said "parasitic flux" lines.

Each magnet 4 is set in a substantially radial orientation within the respective housing seating 12. Each magnet 4 exhibits, in a section along a plane that is substantially perpendicular to rotation axis "A", a head portion 5 located in proximity to an external surface 30 of the rotor body 10 and a base portion 6 facing toward the rotation axis "A". The peripheral portions 14 of the radial expansions 11 and the head portions 5 of the magnets 4 jointly define the profile of the external surface 30 of the rotor body 10.

Advantageously, the base portion 6 of each magnet 4 has a width smaller than a width of the head portion 5, considering that the aforesaid widths are viewed along a direction that is nearly tangential to the radial extension of the magnet 4 itself.

This feature enables the distance between contiguous magnets 4 to be reduced, since it enables a high reciprocal nearing between the magnets 4, without the base portions 6 interfering with one another and excessively reducing the usable section of the saturation portions 16 of the radial expansions 11 of the rotor body 10. This therefore enables a larger number of magnets 4 to be inserted in the rotor 3 without excessively sacrificing the necessary mechanical strength of the rotor body 10.

Therefore, the dimensional relationship between the widths of the head portion 5 and the base portion 6 enables the radial extension of the magnets 4 themselves to be maximised, wholly to the advantage of the surface usable for generating magnetic flux.

In particular, with the specific configuration of the magnets 4 as described above, it is possible to reach a number of magnets 4 equal to or greater than twenty. In other words, the aforesaid number equal to or greater than twenty is to be understood in relation to the angular distribution of the magnets 4 around the rotation axis "A". Therefore, such a number equal to or greater than twenty implies that two contiguous magnets 4 are spaced apart by an angle that is equal to or less than 360°/20, i.e. an angle of 18°.

With such a density of magnets 4, the rotor 3 according to the present invention succeeds in developing a high torque density while simultaneously limiting the overall dimensions.

In the embodiments of FIGS. 2-5, the base portion 6 of each magnet 4 has a conformation that tapers toward the rotation axis "A", as can be easily observed in the details of FIGS. 4 and 5.

The tapered shape of each base portion 6 enables the single magnets 4 to be brought near radially and serves to define a precise geometry of the saturation portion 16 of each radial expansion 11.

In particular, in the embodiment of FIGS. 4-5, each saturation portion 16 exhibits an extension, in the radial direction, having a constant section.

In other words, observing the rotor 3 in a front view as in FIG. 4, each saturation portion 16 has a nearly constant width (tangential to the radial extension thereof). This makes it possible to optimise the state of mechanical stress acting upon the saturation portion 16 itself and thus minimise the risk of sudden breakage of a radial expansion 11 when the rotor 3 is put into operation.

Surprisingly, it has been found that the saturation portions 16 thus realised become saturated, precisely, with "parasitic magnetic flux". This saturation of magnetic flux creates a "magnetic barrier" which prevents other flux lines generated by each magnet 4 to loop back toward the rotor and rather favours the outflow of such flux lines in the direction of the stator flux, thus transforming said flux lines into "usable magnetic flux".

In accordance with an alternative embodiment (which nonetheless benefits from the above-mentioned saturation effect) not illustrated in the appended figures, each saturation portion 16 has a cross section that is not constant but rather has a part with a reduced section in which the thickness is sufficiently low to achieve the saturation of the magnetic flux. Preferably, this part with a reduced section has a minimum thickness that is lower than $$\frac{R - Ra}{15},$$

where R is the external radius of the magnets and Ra is the internal radius of the magnets, with reference to the rotation axis. Preferably said minimum thickness is comprised between $$\frac{R - Ra}{50} \text{ and } \frac{R - Ra}{25}.$$

In a second embodiment, which may be seen in FIG. 5, between the base portion 6 of each magnet 4 and the support ring 18 a basic air gap 21 is present. In other words, each magnet 4 partially occupies the respective housing seating 12, which, between the base portion 6 and the support ring 18, exhibits a void in the material, i.e. a basic air gap 21.

This embodiment exhibiting the basic air gap 21 facilitates assembly of the magnets 4 inside the rotor body 10 since in the area of this basic air gap 21 there is no friction during insertion of the magnet 4 and it moreover enables the realisation of the magnet 4 itself to be simplified, as it does not require any particular dimensional precision in the surface thereof facing the basic air gap 21.

Preferably, the basic air gap 21 can be filled with a non-magnetic filler material to impart further structural solidity to the rotor 3 and minimise the relative movements between the radial expansions 11 of the rotor body 10 and the magnets 4.

In an alternative embodiment, illustrated in FIG. 6, each magnet 4 consists of a plurality of sub-magnets 40 which are superposed on one another in a radial direction and have, in succession, a cross section that decreases toward the axis "A", so that in the base portion 6 thereof the magnet 4 exhibits at least a stepped width reduction. In other words, in this configuration the magnet 4 is an assembled magnet. In particular, cross section refers to the width of each sub-magnet 40 along a direction perpendicular to the direction of radial extension in which the series of sub-magnets 40 lies.

In this embodiment, too, one may find the surprising effect of magnetic saturation of the saturation portions 16 of the radial expansions 11. In fact, in this case as well the "parasitic flux" generated by the magnets 4 is channeled into the saturation portion 16, "filling it" magnetically. In this embodiment it is evident how each saturation portion 16, along the length thereof in the radial direction, exhibits a decreasing section as it nears the drive shaft 25. Precisely the fact that the section of each saturation portion 16 decreases until reaching a predetermined minimum width enables the "magnetic saturation" of each saturation portion 16, and hence the creation of the "magnetic barrier", which prevents additional flux lines generated by each magnet 4 to loop back towards the rotor.

The stepped width reduction of FIG. 6 could also be achieved by means of a single en-bloc magnet 4 exhibiting at least a stepped width reduction.

This alternative embodiment is also constructively advantageous by virtue of the fact that the geometry of the magnets 4 and the associated rotor body 10 are easy to design and realise technologically.

The rotor body 10 and the plurality of magnets 4 are maintained in their axial position through packing means (not illustrated) which lock, them in place.

Among the various constructive solutions for realising such packing means, one preferred embodiment exhibits at least two retaining elements (for example flanges) positioned on opposite sides, along the axial direction, of the stator body 10 and operatively connected by linkage elements that grip the whole rotor body 10. In particular, at least one radial expansion 11 (preferably at least two or four) has at least one through hole 19 fashioned in the respective peripheral portion 14 to enable positioning of a linkage element connecting the retaining elements (e.g. flange).

A non-secondary aspect of the present invention also consists in the design and production of the rotor 3.

As previously mentioned, a serious limitation of "radial magnet" rotors lies in the difficulty of introducing a large number of magnetic poles into the rotor. Therefore, a production method has been defined which enables the realisation of the permanent magnet rotor 3 according to the present invention.

The method comprises steps of preparing a plurality of small plates 20 profiled in such a way as to each exhibit the plurality of radial expansions 11 and housing seatings 12, the housing seatings 12 being intercalated with the radial expansions 11; packing the small plates 20 together along the rotation axis "A" of the rotor 3 so as to obtain the rotor body 10; and inserting a permanent magnet 4 in each housing seating 12.

The small plates 20 are previously profiled according to the geometry it is desired to give to the radial expansions 11 and, accordingly, the housing seatings 12 for the magnets 4. The profiling step can be carried out using, for example, cold cutting (e.g. press), hot cutting (e.g. laser) or stamping techniques.

In particular, the step of preparing the plurality of small plates 20 comprises a succession of steps of stamping small rotor plates.

In one embodiment of the method, only the small rotor plates are realised via the stamping steps and in this case they can have a nominal thickness comprised between 1 mm and 5 mm.

In other words, it is possible to use small plates with a large thickness (between 1 mm and 5 mm, precisely) to obtain a rotor plate that is already intrinsically robust and suitable for subsequent packing steps.

In fact, the greater the nominal thickness of the small plate, the greater the robustness of the plate and the faster the speed of assembly in the subsequent steps.

In a particular embodiment of the method, the small rotor and stator plates are realised in a single cutting step. In this manner machining scraps are minimised.

Once the small plates 20 have been profiled, the step of packing together the small plates 20 can be realised by pre-stacking the individual small plates in groups and subsequently packing together two or more of said groups to obtain the rotor body 10.

Once the rotor body 10 has been formed by packing the small plates 20, it is possible to insert the magnets 4 into the housing seatings 12.

To ensure further structural compactness of the rotor body 10, the above-mentioned non-magnetic filler material is injected between the magnets 4 and the radial expansions 11.

In particular, during the step of packing the small plates 20, retaining elements (flanges) are positioned on opposite sides, along the axial direction, of the stator body 10.

To lock the retaining elements in place, locking elements (not illustrated) such as Seeger rings, for example, can be used.

Alternatively, or in cooperation with the locking elements, linkage elements are used; these are operatively connected to the retaining elements so as to grip the whole rotor body 10 and lock the retaining elements in place.

The invention achieves the objects proposed. The rotor having a rotor body suitable for accommodating a plurality of magnets which exhibit a respective base portion having a width smaller than the width of a head portion thereof makes it possible to obtain a high number of magnetic poles in the rotor and ensure the necessary mechanical strength of the rotor body itself. The particular form and arrangement of the magnets in the rotor enables the "parasitic flux" to be minimised and, surprisingly, the "usable flux" to be maximised, thus obtaining high torque densities even in rotors of relatively small size. Likewise, the separating openings in proximity to the external surface of the rotor body enables the flux lines of the magnets to be conveyed and directed in a more deterministic manner toward the stator flux, further maximising the "usable flux" and hence the power that can be released by the electric machine.

The invention claimed is:

1. A permanent magnet rotor (3) for a rotary electric machine (1), comprising:
    a rotor body (10) having a rotation axis (A);
    a plurality of magnets (4), each arranged along a substantially radial direction of said rotor body (10), said magnets (4) exhibiting, in section along a plane that is substantially perpendicular to said rotation axis (A), a head portion (5) located in proximity of an external surface (30) of said rotor body (10) and a base portion (6) facing towards the rotation axis (A);
    the base portion (6) of each magnet (4) having a width smaller than a width of the head portion (5);
    wherein said magnets (4) are equal or greater in number than twenty;
    wherein said rotor body (10) exhibits a plurality of radial expansions (11) and a plurality of housing seatings (12) intercalated with said radial expansions (11) in order to house said magnets (4), wherein contiguous radial expansions (11) exhibit respective peripheral portions (14) distanced from one another in order to define respective separating openings (13) suitable for preventing direct passage of magnetic flow between said peripheral portions (14), said separating openings (13) extending along a whole axial length of said rotor body (10);
    wherein the base portion (6) of each magnet (4) has a tapered conformation in a nearing direction to said rotation axis (A).

2. The rotor (3) according to claim 1, wherein each magnet (4) exhibits a plurality of sub-magnets (40) which are superposed on one another in a radial direction and have, in succession, a transversal section that decreases in a nearing direction to said rotation axis (A) such that, at the base portion (6) thereof, the magnet (4) exhibits at least a stepped width reduction.

3. The rotor (3) according to claim 1, wherein the peripheral portions (14) of each radial expansion (11) exhibit lateral hooking portions (15) facing towards the contiguous radial expansions (11) in order to retain the adjacent magnets (4) internally of the respective housing seatings (12).

4. The rotor (3) according to claim 1, wherein each radial expansion (11) exhibits a saturation portion (16) interposed between the base portions (6) of two adjacent magnets (4) such as to realise a saturation of the magnetic field present internally of said radial expansion (11), said saturation portion (16) exhibiting a tract having a small section having a thickness of less than $$\frac{R - Ra}{15}$$

where R is the external radius of the magnets and Ra is the internal radius of the magnets.

5. The rotor (3) according to claim 4, wherein said saturation portion (16) exhibits a tract having a small section having a thickness comprised between $$\frac{R-Ra}{50} \text{ and } \frac{R-Ra}{25}.$$

6. The rotor (3) according to claim 1, wherein the rotor body (10) is defined by a plurality of small plates (20) packed on one another along the rotation axis (A).

7. The rotor (3) according to claim 6, wherein at least a radial expansion (11) exhibits a hole (19) for housing a tie-rod for stacking said plates (20).

8. The rotor (3) according to claim 6, wherein at least a radial expansion (11) exhibits a hole (19), at said peripheral portion (14), for housing a tie-rod for stacking said plates (20).

9. A synchronous motor (1), comprising:
a stator (2);
a rotor (3) according to claim 1.

* * * * *